United States Patent
Jehle et al.

(10) Patent No.: US 10,732,015 B2
(45) Date of Patent: Aug. 4, 2020

(54) DIFFERENTIAL PRESSURE MEASURING ARRANGEMENT

(71) Applicant: Endress+Hauser SE+Co. KG, Maulburg (DE)

(72) Inventors: Max Jehle, Wehr (DE); Davide Parrotto, Weil am Rhein (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/643,049

(22) PCT Filed: Jul. 12, 2018

(86) PCT No.: PCT/EP2018/068936
§ 371 (c)(1),
(2) Date: Feb. 28, 2020

(87) PCT Pub. No.: WO2019/042642
PCT Pub. Date: Mar. 7, 2019

(65) Prior Publication Data
US 2020/0209023 A1  Jul. 2, 2020

(30) Foreign Application Priority Data
Aug. 31, 2017 (DE) .................. 10 2017 120 021

(51) Int. Cl.
*G01F 1/36* (2006.01)
*G01F 25/00* (2006.01)
(Continued)

(52) U.S. Cl.
CPC ............ *G01F 1/36* (2013.01); *G01F 25/0007* (2013.01); *G01L 13/00* (2013.01); *G01L 27/007* (2013.01)

(58) Field of Classification Search
CPC .................................. G01F 1/36; G01F 25/00
See application file for complete search history.

(56) References Cited

U.S. PATENT DOCUMENTS

| | | | |
|---|---|---|---|
| 5,680,109 | A | 10/1997 | Lowe et al. |
| 7,860,669 | B2 * | 12/2010 | Najim Al-Khamis ...................... E21B 43/34 702/50 |

(Continued)

FOREIGN PATENT DOCUMENTS

| | | |
|---|---|---|
| DE | 102006005143 A1 | 8/2007 |
| DE | 102013110059 A1 | 3/2015 |
| WO | 2008083720 A1 | 7/2008 |

*Primary Examiner* — Jewel V Dowtin
(74) *Attorney, Agent, or Firm* — Mark A. Logan; Endress+Hauser (USA) Holding Inc.

(57) ABSTRACT

A differential pressure measuring arrangement, comprising: a differential pressure measuring transducer; a first differential pressure line supplying the differential pressure measuring transducer with the first media pressure; a second differential pressure line supplying the differential pressure measuring transducer with the second media pressure; a temperature sensor; and a processing and evaluation unit for processing the differential pressure measurement signal and the temperature signal; wherein the processing and evaluation unit is adapted to determine a significant correlation between a change of the temperature signal and the differential pressure signal and to consider such as indication of a plugged differential pressure line and is further adapted to test whether a considered indication of a plugged differential pressure line can be verified based on additional process data, which preferably were not registered by the differential pressure measuring transducer.

15 Claims, 2 Drawing Sheets

(51) Int. Cl.
  *G01L 13/00*  (2006.01)
  *G01L 27/00*  (2006.01)

(56) References Cited

U.S. PATENT DOCUMENTS

| | | | |
|---|---|---|---|
| 8,516,900 B2 * | 8/2013 | Pihlaja | G01F 1/74 |
| | | | 73/861.04 |
| 9,964,533 B2 * | 5/2018 | Ahmad | G01N 33/2847 |
| 2004/0249583 A1 | 12/2004 | Eryurek et al. | |

* cited by examiner

DIFFERENTIAL PRESSURE MEASURING ARRANGEMENT

CROSS-REFERENCE TO RELATED APPLICATIONS

The present application is related to and claims the priority benefit of German Patent Application No. 10 2017 120 021.5, filed on Aug. 31, 2017 and International Patent Application No. PCT/EP2018/068936, filed on Jul. 12, 2018, the entire contents of which are incorporated herein by reference.

TECHNICAL FIELD

The invention relates to a differential pressure measuring arrangement and to a method for monitoring a differential pressure measuring arrangement.

BACKGROUND

Differential pressure measuring arrangements with differential pressure lines serve especially for flow measurement or filter monitoring, wherein differential pressure lines are connected in the flow direction above and below means causing a differential pressure, for example, a diaphragm or a Venturi nozzle, or a filter, to media containing lines, in order to transfer the differential pressure by means of the medium to a differential pressure measuring transducer of the differential pressure measuring arrangement. During operation of such measuring arrangements, the differential pressure lines can become plugged, whereby reliable measuring is degraded. There are, consequently, efforts known, which are directed at early detection of plugging of differential pressure lines.

German patent application DE 10 2013 110 059 A1 describes a differential pressure measuring arrangement, which detects plugged differential pressure lines based on a correlation of a differential pressure measurement signal, which shows a pressure difference between a first media pressure and a second media pressure, and a temperature signal, which correlates with a temperature of a differential pressure line.

DE 10 2013 110 059 A1, in such case, detects plugged differential pressure lines using only measured values (differential pressure and temperature), which were registered by the differential pressure measuring arrangement itself. This can lead to false alarms, i.e. claims of plugging, when the differential pressure lines really are not plugged. For example, the temperature of the differential pressure line registered by a temperature sensor of the differential pressure measuring arrangement slightly rises and simultaneously the flow in the process is slowly increased, for example, by increasing the RPM of a pump. In such case, a processing unit of the differential pressure measuring arrangement would detect a correlation between the temperature rise and the differential pressure and likewise diagnose an elevated signal noise, based on which a plugged differential pressure line would be determined and, in given cases, a false alarm output, even though plugging would not actually be present.

SUMMARY

It is, consequently, an object of the present invention to provide an improved differential pressure measuring arrangement and a method, which enable a plugged differential pressure line to be correctly identified with higher probability. The object is achieved according to the invention by the differential pressure measuring arrangement as defined in patent claim 1 and the method as defined in patent claim 9.

The differential pressure measuring arrangement of the invention comprises:
a differential pressure measuring transducer for registering a difference between a first media pressure and a second media pressure and for providing a differential pressure measurement signal, which depends on the difference between a first media pressure and a second media pressure;
a first differential pressure line, which is connected to a first pressure input of the differential pressure measuring transducer, in order to supply the differential pressure measuring transducer with the first media pressure;
a second differential pressure line, which is connected to a second pressure input of the differential pressure measuring transducer, in order to supply the differential pressure measuring transducer with the second media pressure;
at least one temperature sensor for outputting a temperature signal, which correlates with a temperature of the differential pressure lines; and
a processing- and/or evaluation unit for processing the differential pressure measurement signal and the temperature signal;
wherein the processing- and/or evaluation unit is adapted, based on the differential pressure measurement signal and the temperature signal, to determine a significant correlation between a change of the temperature signal and the differential pressure signal, and to consider the determining of a significant correlation as indication of a plugged differential pressure line, and is adapted, furthermore, to test, whether a considered indication of a plugged differential pressure line can be verified based on additional process data of the process, process data which preferably were not registered by the differential pressure measuring transducer.

According to the invention, a differential pressure measuring arrangement is provided which, in the case of a determined significant correlation between a change of the temperature signal and the differential pressure signal, after having considered such as indication of a plugged differential pressure line, supplementally applies additional process data to verify the considered indication of a plugged differential pressure line. The additional process data are especially data, which are in the form of measurement- and/or actuating values of a process, in which the differential pressure measuring arrangement is applied, and which were not registered by the differential pressure measuring arrangement itself.

Thus, in contrast to the above mentioned patent application DE 10 2013 110 059 A1, which uses exclusively its own measured values for detecting plugged differential pressure lines, here additional process data are used for verification, data which were not registered by the differential pressure measuring arrangement. The additional process data can, for example, have been registered by field devices applied in the process for controlling and/or registering the additional process data, for example, in the form of process variables. Such field devices of automation technology are often applied for registering and/or influencing process variables. Examples of such field devices are fill level measuring devices, mass flowmeters, pressure- and temperature measuring devices, pH-redox potential-measuring devices, conductivity measuring devices, etc., which as sensors register the corresponding process variables, fill level, flow, pressure, temperature, pH value, and conductivity value. Serving for influencing process variables are so-called actuators, e.g. valves, which control the flow of a liquid in a pipe, tube or pipeline section, or pumps, which change the fill level in a container. Referred to as field devices are, thus, in principle, all devices, which are applied near to the process and which deliver, or process, process relevant information in the form of process data. In connection with the invention, the terminology, field device, includes, thus, all types of measuring devices and actuators.

An advantageous embodiment of the invention provides that the differential pressure measuring arrangement includes, furthermore, a data repository arranged away from the differential pressure measuring transducer, preferably a central, data repository, for example, a process control system or a cloud, wherein the differential pressure measuring transducer includes the processing- and/or evaluation unit and the processing- and/or evaluation unit is adapted, furthermore, to retrieve, or to receive, the additional process data from the data repository for the testing.

An alternative advantageous embodiment of the invention provides that the differential pressure measuring arrangement includes, furthermore, a data repository arranged away from the differential pressure measuring transducer, preferably a central data repository, for example, a process control system or a cloud, wherein the data repository includes at least a first part of the processing- and/or evaluation unit, wherein the first part of the processing- and/or evaluation unit in the data repository is adapted to test, whether a considered indication of a plugged differential pressure line can be verified based on additional process data of the process, process data which preferably were not registered by the differential pressure measuring transducer.

Another advantageous embodiment of the invention provides that the differential pressure measuring transducer has a second part of the processing- and/or evaluation unit, wherein the second part of the processing- and/or evaluation unit is adapted based on the differential pressure measurement signal and the temperature signal to determine a significant correlation between a change of the temperature signal and the differential pressure signal, and to consider the determining of a significant correlation as indication of a plugged differential pressure line. Especially, the embodiment can provide that the second part of the processing- and/or evaluation unit is adapted, furthermore, to communicate the indication of a plugged differential pressure line to the first part of the processing- and/or evaluation unit and the first part of the processing- and/or evaluation unit is adapted, furthermore, based on the additional process data of the process, to test, whether the indication can be verified.

Another advantageous embodiment of the invention provides that the processing- and/or evaluation unit is adapted to consider a positive correlation between, on the one hand, a temperature signal change corresponding to a temperature rise, and the differential pressure signal, on the other hand, as indication of a plugging of the first differential pressure line.

In turn, another advantageous embodiment of the invention provides that the processing- and/or evaluation unit is adapted to consider a negative correlation between, on the one hand, a temperature signal change corresponding to a temperature rise, and the differential pressure signal, on the other hand, as indication of a plugging of the second differential pressure line.

A last advantageous embodiment of the invention provides that the processing- and evaluation unit is further adapted to ascertain at least one characteristic parameter of a noise or a fluctuation of the differential pressure measurement signal, and to take such into consideration in the determining of a plugged differential pressure line.

The invention relates further to a method for monitoring a differential pressure measuring arrangement, wherein the differential pressure measuring arrangement includes a differential pressure measuring transducer for registering a difference between a first media pressure and a second media pressure and for providing a differential pressure measurement signal, which depends on the difference between the first media pressure and the second media pressure; a first differential pressure line, which is connected to a first pressure input of the differential pressure measuring transducer, in order to supply the differential pressure measuring transducer with the first media pressure; a second differential pressure line, which is connected to a second pressure input of the differential pressure measuring transducer, in order to supply the differential pressure measuring transducer with the second media pressure; and at least one temperature sensor for outputting a temperature signal, which correlates with a temperature of the differential pressure lines, wherein the method comprises method steps as follows:
  a) at least at times, registering, as a function of time, the temperature signal and the differential pressure measurement signal,
  b) determining whether there is a significant correlation between a change of the temperature signal and the differential pressure signal, and considering a significant correlation as indication of a plugged differential pressure line,
  c) testing whether the considering of the determining of a significant correlation between a change of the temperature signal and the differential pressure signal as indication of a plugged differential pressure line can be verified based on additional process data of the process, process data which preferably were not registered by the differential pressure measuring transducer.

An advantageous form of embodiment of the invention provides that at least method step c) is executed by a processing- and/or evaluation unit arranged within the differential pressure transducer and the additional process data are retrieved or received from a data repository, preferably a central data repository, for example, a process control system or a cloud, for executing the method step c).

An alternative form of embodiment of the invention provides that at least method step c) is performed from a data repository arranged outside of the differential pressure transducer, preferably a central data repository, which has the additional process data of the process. Especially, this form of embodiment can provide that at least the method step b) is performed by a processing- and/or evaluation unit arranged within the differential pressure transducer and the processing- and/or evaluation unit transmits the indication of a plugged differential pressure line to the data repository, wherein the data repository tests based on the additional process data of the process whether the indication can be verified.

Another advantageous form of embodiment of the invention provides that the additional process data of the process are registered by field devices, which monitor and/or control the process, and the process data of the process are provided to the data repository by the field devices.

An advantageous form of embodiment of the invention provides that the method further includes an analysis of a noise or a fluctuation of the differential pressure measurement signal, and testing whether the noise or the fluctuation indicates a plugged differential pressure line.

An advantageous form of embodiment of the invention provides that a plugged differential pressure line is signaled when the considering of the determining of a significant correlation between a change of the temperature signal and the differential pressure signal as indication of a plugged differential pressure line is verified based on additional process data of the process.

BRIEF DESCRIPTION OF THE DRAWINGS

The invention will now be explained in greater detail based on the appended drawing, the figures of which show as follows.

DETAILED DESCRIPTION

Figure 1:
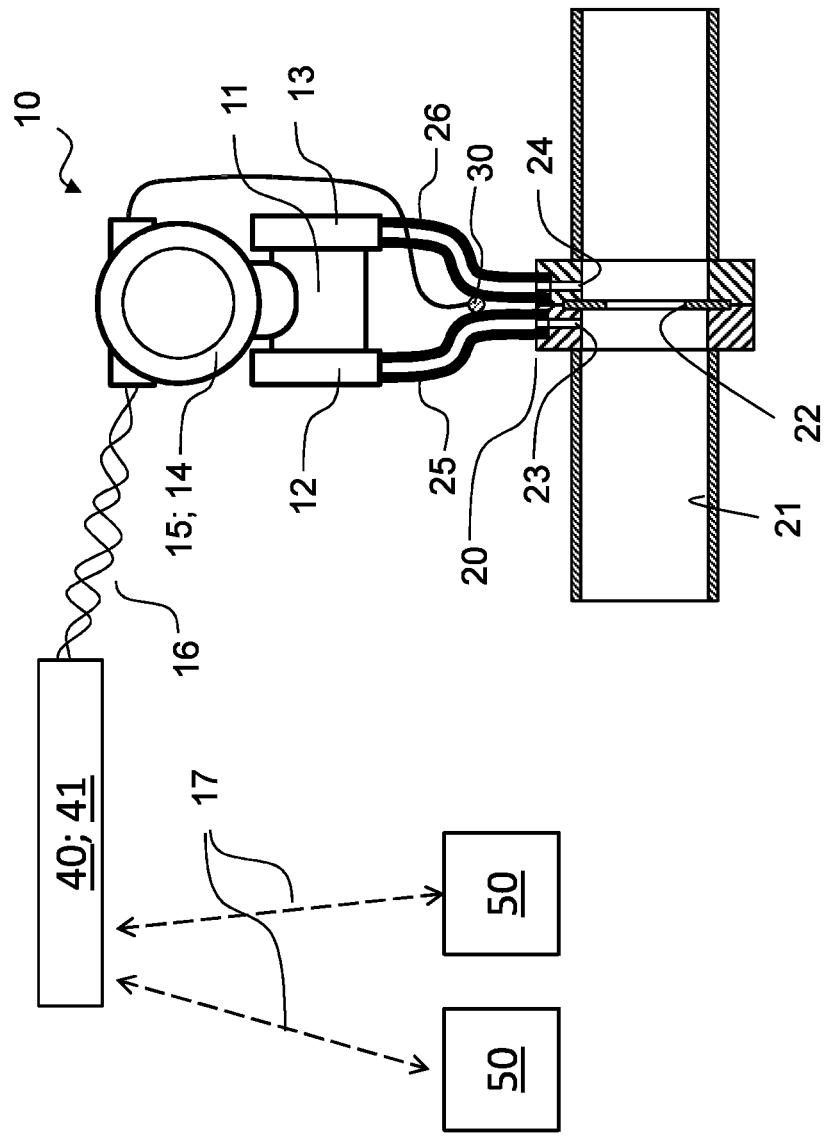
FIG. 1 shows a schematic view of a first example of the present disclosure for an embodiment of the differential pressure measuring arrangement.
Figure 2:
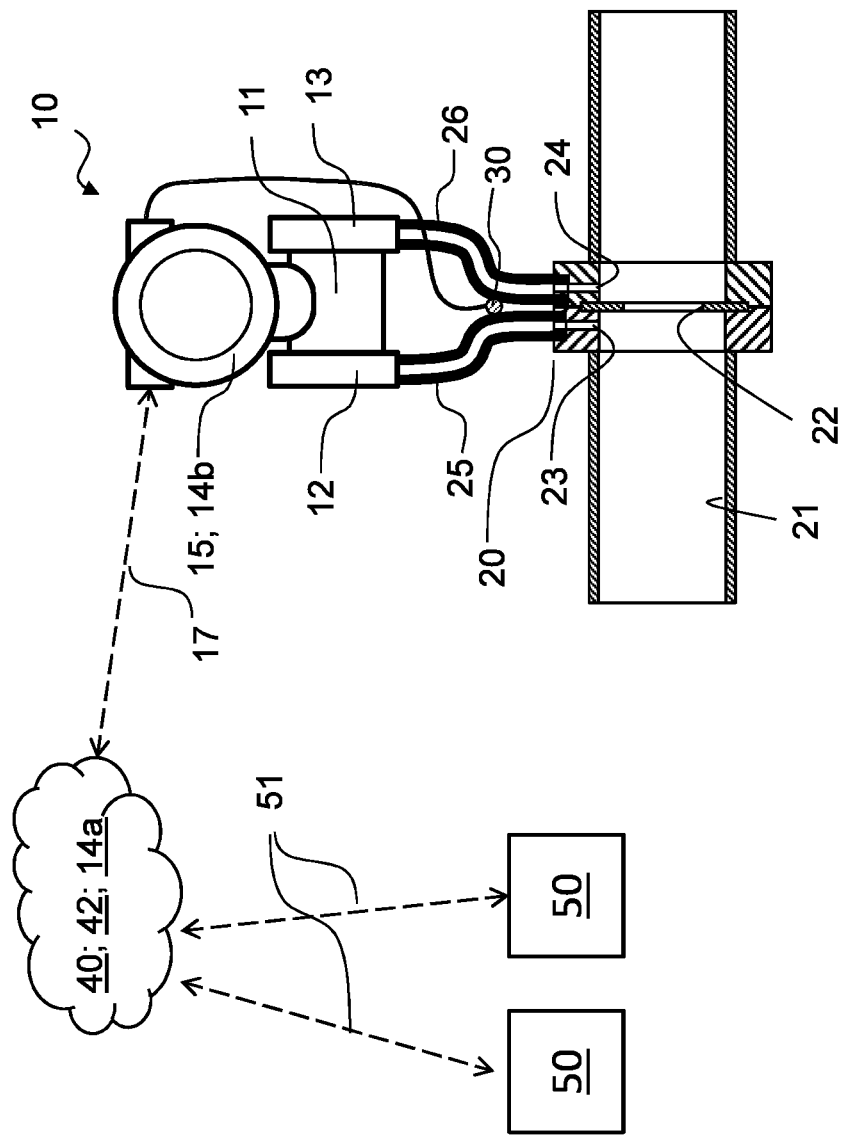
FIG. 2 shows a schematic view of a second example of the present disclosure for an embodiment of the differential pressure measuring arrangement.

The examples of embodiments shown in FIGS. 1 and 2 for the differential pressure measuring arrangement of the invention comprise, in each case, a differential pressure measurement transducer 10, which has a sensor module 11, which is arranged between a first, high pressure side, process connection flange 12 and a second, low pressure side, process connection flange 13, and an electronics module 15 having a processing- and/or evaluation unit 14, which is held by the sensor module 11, supplies the sensor module with energy and processes signals of the sensor module. The electronics module is connected to a process control system 41 via a two-wire line 16, wherein the electronics module 15 communicates and is supplied with energy via the two-wire line 16. The two-wire line 16 can especially be operated as a fieldbus according to the Profibus-, Foundation Fieldbus or HART standard. Such differential pressure measurement transducers 10 are known per se and are produced and sold by the applicant, for example, under the mark, Deltabar. The differential pressure measuring arrangement additionally includes a differential pressure means 20 for installation in a pipeline 21. The differential pressure means includes a diaphragm 22, a first pressure registering duct 23 on a high pressure side of the diaphragm 22 and a second pressure registering duct 24 on a low pressure side of the diaphragm 22. The high pressure side, process connection flange 12 is connected via a high pressure side, differential pressure line 25 to the high pressure side, pressure registering duct 23, and the low pressure side, process connection flange is connected via a low pressure side, differential pressure line 26 to the low pressure side, pressure registering duct 24. The terms "high pressure side" and "low pressure side" relate to a differential pressure, or pressure difference, produced by a flow (in the drawing, from left to right), wherein the pressure difference is proportional to the square of the flow velocity and lies, for example, in the order of magnitude of some 10 to 100 mbar. The static pressure, on which this flow dependent differential pressure is superimposed, can lie in the range of, for example, 1 bar to some 100 bar. The differential pressure is registered with a sensor element of the sensor module 11, wherein the sensor module outputs to the electronics module 15 a sensor module signal dependent on the registered differential pressure, wherein the processing- and/or evaluation unit 14 of the electronics module 15, based on the sensor module signal, generates a differential pressure measurement signal representing the differential pressure and outputs such via the two-wire line 16 to the process control system 41. Time series of the differential pressure measurement signal and/or fluctuations of the differential pressure measurement signal can be stored in a data memory of the electronics module and/or in the process control system.

Furthermore, the differential pressure measuring arrangement includes a temperature sensor 30, which registers a temperature of the differential pressure lines. To the extent that it can be assumed that the temperatures of the differential pressure lines are essentially equal, one temperature sensor is sufficient. When, in contrast, significantly differing temperatures are to be expected, it can be advantageous to provide a separate temperature sensor for each differential pressure line. Temperature sensor 30 is connected to the electronics module 15 to supply such with its temperature measurement signals, each of represents a current measured temperature. From the temperature measurement signals and/or their fluctuations, time series can be stored in the measuring transducer and/or control system.

Based on the time series of the differential pressure measurement signals and the temperature measured values, or the corresponding fluctuations, it is determined, whether a differential pressure line is plugged and, when yes, which.

As known from the state of the art, a plugging of the differential pressure lines can be recognized by an analysis of the fluctuations, or the noise, of the differential pressure measurement signal.

Fundamentally, the present invention can apply any of the fluctuation analyses, as follows: Time series of the differential pressure measurement signals are evaluated over a longer period of time of a number of hours, for example, 8 to 16 hours, as regards their fluctuation, or their noise and their correlation with the corresponding time series of the temperature measured values, wherein, especially in the case of the analysis of the fluctuation, or of the noise, a comparison with reference data, which has been registered in a reference state of the plant, is advantageous. Fundamentally, fluctuations, or noise, in the pressure of a flowing medium become greater with increasing flow velocity of the medium. In the case of an intact flow measuring arrangement, however, these fluctuations reach via the two differential pressure lines to the differential pressure measurement transducer, and there cancel one another to a certain degree.

When, now, one differential pressure line progressively gets plug, then, with time, the canceling becomes less, so that the fluctuations, or the noise, in the differential pressure measurement signal increases. In such case, this is noted especially in the case of fluctuations in a frequency range of greater than 1 Hz, especially greater than 10 Hz, or greater than 100 Hz.

When, thus, in the case of a given flow, or average differential pressure, the fluctuation of the differential pressure measurement signal has increased in comparison with reference data, which were registered in the case of open differential pressure lines, such is a first indication of a completely or partially plugged, differential pressure line.

The present invention is designed to prevent defective diagnoses of a plugged differential pressure line due to increased fluctuations of the differential pressure measurement signal.

The probability of a plugging in the case of a determined increase of the fluctuation $P(PL|F+)$ is given as:

$$P(PL|F+)=P(F+|PL)*P(PL)/[P(F+|PL)*P(PL)+P(F+|open)*P(open)] \quad (1)$$

In such case, P(F+|PL) is the probability that in the case of a plugging an increasing fluctuation is determined, P(PL) is the probability that a differential pressure line is plugged, P(F+|open) is the probability that in the case of an open differential pressure line an increase of the fluctuations is determined, and P(open) is the probability that a differential pressure line remains open. If one assumes for the purpose of explanation that 2% of all differential pressure lines stop working because of plugging, wherein a plugged differential pressure line leads with a probability of 99% to a determination of an increase of the fluctuations, and one assumes that an open differential pressure line leads with a probability of only 4% to the determining of an increased fluctuation, then the probability of a plugging in the case of a determined increase of the fluctuation P(PL|F+) is, according to Equation 1, only a third.

This is not a satisfactory situation for the operator of a process installation, who has to decide based on the finding, whether the plant should be shut down and subjected to maintenance, since two of three maintenance stoppages would be unnecessary.

Analysis of a correlation between a change of the temperature measurement signal and the differential pressure measurement signal provides an independent approach for determining whether plugging is present, for when, due to a plugging, a medium is stuck in a differential pressure line, then a temperature change and a volume change of the medium associated therewith effects a pressure change in the differential pressure line, which directly affects the measured differential pressure. When the plugging is still not complete, then, in the case of a temperature change, medium must flow back or forth through the occurring plugging, which acts as a throttle, to provide volume equalization. Also this effects in the affected differential pressure line a pressure change, which affects the differential pressure measurement signal.

A correlation between a change of the temperature measurement signal and the differential pressure measurement signal is, consequently, an indication of a plugging independent of the fluctuation analysis of the differential pressure measurement signal. By combining the two aforementioned analytical methods, information concerning a determined plugging is more reliable, such as will now be explained.

The probability of a plugging in the case of a determined correlation between a change of the temperature measurement signal and the differential pressure measurement signal P(PL|K) is given by:

$$P(PL|K)=P(K|PL)*P(PL)/[P(K|PL)*P(PL)+P(K|open)*P(open)] \quad (2)$$

In such case, P(K|PL) is the probability that in the case of a plugging a correlation between the change of the temperature measurement signal and the differential pressure measurement signal is determined, P(PL) is the probability that a differential pressure line is plugged, P(K|open) is the probability that in the case of an open differential pressure line a correlation between the change of the temperature measurement signal and the differential pressure measurement signal is determined, and P(open) is the probability that a differential pressure line remains open. If one assumes again for the purpose of explanation that 2% of all differential pressure lines stop working because of plugging, wherein a plugged differential pressure line leads with a probability of 90% to a determination of an increase of fluctuations, and one assumes that an open differential pressure line leads with a probability of 10% to determining a correlation between the change of the temperature measurement signal and the differential pressure measurement signal, then the probability of a plugging in the case of a determined correlation between the change of the temperature measurement signal and the differential pressure measurement signal P(PL|F+) amounts according to Equation 2 to only one sixth. Taken alone, this test is not as good as the fluctuation test. By combining the two independent tests, however, a significant gain in the reliability of determining a plugging results.

If one assumes, for example, a positive result in the case of the second test, then a plugging of a differential pressure line is present with a probability of P(PL)=1/6. If one uses this probability, P(PL)=1/6, as a first probability for a plugging into the consideration of the significance of the independent fluctuation analysis for a plugging, then according to Equation 1 with otherwise unchanged assumptions:

$$P(PL|F+)=P(F+|PL)*P(PL)/[P(F+|PL)*P(PL)+P(F+|open)*P(open)]$$

$$=99\%*1/6/[99\%*1/6+4\%*5/6]$$

$$=5/6$$

By combining the two tests in the case of correctness of the assumed boundary conditions, the reliability of determining a plugging is increased from 1/3 to 5/6. This is an improvement of the prediction quality by two and one half times, even though the second test can, per se, be less reliable than the first.

The indications for a plugging based on the two analyses can be combined in the following way:

If a plugging of the high pressure side, differential pressure line 25 forms, the fluctuation of the differential pressure measurement signal increases, and the correlation of the differential pressure measurement signal with changes of the measured value of temperature moves toward +1.

If a plugging of the low pressure side, differential pressure line 26 forms, the fluctuation of the differential pressure measurement signal increases, and the correlation of the differential pressure measurement signal with changes of the measured value of temperature moves toward −1.

If the two differential pressure lines are open, an unchanged fluctuation of the differential pressure measurement signal is to be expected, and the correlation of the differential pressure measurement signal with changes of the measured value of temperature moves toward zero.

If a plugging in both differential pressure lines forms, then a decreasing fluctuation of the differential pressure measurement signal is to be expected, and the correlation of the differential pressure measurement signal with changes of the measured value of temperature moves toward zero.

In ongoing measurement operation, the two discussed diagnostic routines concerning fluctuations of the differential pressure measurement signal and correlations between temperature changes and the differential pressure measurement signal can be performed periodically, wherein, as a function of findings set forth in the first and second columns, the state set forth in the third column is determined.

| fluctuation dP | correlation dP and T | state |
| --- | --- | --- |
| increased | 1 | high pressure side, differential pressure line (p+) plugged |
| increased | −1 | low pressure side, differential pressure line (p−) plugged |

-continued

| fluctuation dP | correlation dP and T | state |
|---|---|---|
| normal | 0 | both differential pressure lines open |
| decreased | 0 | both differential pressure lines plugged |

In the case that a plugging of the high pressure side and/or low pressure side, differential pressure line is determined, the invention provides that a verification of the determined state is performed with the assistance of additional process data 51, before a signaling of a plugged differential pressure line occurs. For this, it is provided according to the first example of an embodiment shown in FIG. 1 that the processing- and/or evaluation unit 14 of the electronics module 15 of the differential pressure measuring transducer 10 is adapted to perform the verification. For verification, the processing- and/or evaluation unit 14 can access a data repository 40 receiving the additional process data of the process, in order to perform a verification based on such additional process data 51.

The additional process data 51 are registered by additional field devices 50, which are located in the process, or serve for controlling the process by means of a correspondingly formed, additional field device 50, for example, a valve. The additional process data can be, for example, the desired value of the flow or the RPM of a pump. The additional process data 51 are held centrally in a data memory, or data repository, 40, where the process data is collected. As shown in FIG. 1, the additional process data 51 can be held, for example, in the process control system 41, which serves to guide the process in a plant. Alternatively, the additional process data 51 can, such as shown in FIG. 2, also be kept ready in a cloud 42, which is provided supplementally or alternatively to the process control system. In such case, the process control system can likewise be formed by parts of the cloud, or, however, be run separately therefrom. In the latter case, the control of the plant can occur via the field devices networked by the cloud and the additional process data 51 are held in the central data repository to be retrieved by the processing- and/or evaluation unit 14.

The processing- and/or evaluation unit 14 can, as evident from FIG. 1, be embodied in such a manner that it is located completely within the differential pressure transducer 10 or, as evident from FIG. 2, it is divided into at least a first part 14a and a second part 14b. In such case, only the second part 14b is located within the differential pressure transducer 10 and serves for determining the significant correlation between the change of the temperature signal and the differential pressure signal and for evaluating the significant correlation as indication of a plugged differential pressure line. The first part 14a is separated from the differential pressure transducer 10, depending on embodiment, and located either in the process control system 41 or the data repository 40, for example, the cloud, and serves to verify the indication of a plugged differential pressure line based on the additional process data 51 established by the second part 14b. Another option is naturally also that the first part 14a is embodied independently of the process control system 41 and/or the data repository 40 and forms a separate unit.

The invention claimed is:
1. A differential pressure measuring arrangement, comprising:
   a differential pressure measuring transducer for registering a difference between a first media pressure and a second media pressure and for providing a differential pressure measurement signal that depends on the difference between the first media pressure and the second media pressure;
   a first differential pressure line connected to a first pressure input of the differential pressure measuring transducer in order to supply the differential pressure measuring transducer with the first media pressure;
   a second differential pressure line connected to a second pressure input of the differential pressure measuring transducer in order to supply the differential pressure measuring transducer with the second media pressure;
   a temperature sensor for outputting a temperature signal that correlates with a temperature of the differential pressure lines; and
   a processing and evaluation unit for processing the differential pressure measurement signal and the temperature signal;
   wherein the processing and evaluation unit is adapted, based on the differential pressure measurement signal and the temperature signal, to determine a significant correlation between a change of the temperature signal and the differential pressure signal, and to consider the determining of a significant correlation as an indication of a plugged differential pressure line, and
   wherein the processing and evaluation unit is further adapted to test whether a considered indication of a plugged differential pressure line can be verified based on additional process data of the process.

2. The differential pressure measuring arrangement as claimed in claim 1, further comprising:
   a data repository arranged away from the differential pressure measuring transducer,
   wherein the differential pressure measuring transducer includes the processing and evaluation unit and the processing and evaluation unit is further adapted to retrieve, or to receive, the additional process data from the data repository for the testing.

3. The differential pressure measuring arrangement as claimed in claim 1, further comprising:
   a data repository arranged away from the differential pressure measuring transducer,
   wherein the data repository includes at least a first part of the processing and evaluation unit, and
   wherein the first part of the processing and evaluation unit in the data repository is adapted to test whether a considered indication of a plugged differential pressure line can be verified based on additional process data of the process.

4. The differential pressure measuring arrangement as claimed in claim 3, wherein the differential pressure measuring transducer has a second part of the processing and evaluation unit, wherein the second part of the processing and evaluation unit is adapted, based on the differential pressure measurement signal and the temperature signal, to determine a significant correlation between a change of the temperature signal and the differential pressure signal, and to consider the determining of a significant correlation as indication of a plugged differential pressure line.

5. The differential pressure measuring arrangement as claimed in claim 4, wherein the second part of the processing and evaluation unit is further adapted to communicate the indication of a plugged differential pressure line to the first part of the processing and evaluation unit and the first part of the processing and evaluation unit is further adapted, based on the additional process data of the process, to test whether the indication can be verified.

6. The differential pressure measuring arrangement as claimed in claim 1, wherein the processing and evaluation unit is adapted to consider a positive correlation between a temperature signal change corresponding to a temperature rise and the differential pressure signal as an indication of a plugging of the first differential pressure line.

7. The differential pressure measuring arrangement as claimed in claim 1, wherein the processing and evaluation unit is adapted to consider a negative correlation between a temperature signal change corresponding to a temperature rise and the differential pressure signal as an indication of a plugging of the second differential pressure line.

8. The differential pressure measuring arrangement as claimed in claim 1, wherein the processing and evaluation unit is further adapted to ascertain at least one characteristic parameter of noise or a fluctuation of the differential pressure measurement signal and to take the at least one characteristic parameter into consideration in the determining of a plugged differential pressure line.

9. A method for monitoring a differential pressure measuring arrangement, comprising:
  providing a differential pressure measuring arrangement including:
    a differential pressure measuring transducer for registering a difference between a first media pressure and a second media pressure and for providing a differential pressure measurement signal that depends on the difference between a first media pressure and a second media pressure;
    a first differential pressure line connected to a first pressure input of the differential pressure measuring transducer, in order to supply the differential pressure measuring transducer with the first media pressure;
    a second differential pressure line connected to a second pressure input of the differential pressure measuring transducer, in order to supply the differential pressure measuring transducer with the second media pressure; and
    a temperature sensor for outputting a temperature signal that correlates with a temperature of the differential pressure lines;
  registering as a function of time the temperature signal and the differential pressure measurement signal;
  determining whether there is a significant correlation between a change of the temperature signal and the differential pressure signal, and considering the significant correlation as an indication of a plugged differential pressure line; and
  testing whether the considering of the determining of a significant correlation between a change of the temperature signal and the differential pressure signal as an indication of a plugged differential pressure line can be verified based on additional process data of the process.

10. The method as claimed in claim 9,
  wherein the differential pressure transducer further includes a processing and evaluation unit, and
  wherein the testing is executed by the processing and evaluation unit, the method further comprising:
  retrieving or receiving from a central data repository the additional process data.

11. The method as claimed in claim 9, wherein the testing is performed from a data repository arranged outside of the differential pressure transducer, wherein the data repository has the additional process data of the process.

12. The method as claimed in claim 11, wherein the determining of a significant correlation is performed by the processing and evaluation unit arranged within the differential pressure transducer, the method further comprising:
  the processing and evaluation unit transmitting the indication of a plugged differential pressure line to the data repository; and
  the data repository testing based on the additional process data of the process whether the indication can be verified.

13. The method as claimed in claim 9, wherein the additional process data of the process are registered by field devices that monitor and/or control the process and the process data of the process are provided to the data repository by the field devices.

14. The method as claimed in claim 9, further comprising:
  analyzing noise or a fluctuation of the differential pressure measurement signal; and
  testing whether the noise or the fluctuation indicates a plugged differential pressure line.

15. The method as claimed in claim 9, further comprising:
  signaling a plugged differential pressure line when the considering of the determining of a significant correlation between a change of the temperature signal and the differential pressure signal as an indication of a plugged differential pressure line is verified based on additional process data of the process.

* * * * *